US005161292A

United States Patent [19]

Kurtyak et al.

[11] Patent Number: 5,161,292

[45] Date of Patent: Nov. 10, 1992

[54] RAIL ANCHOR WRENCH

[75] Inventors: Andrew G. Kurtyak, Joliet, Ill.; Randy D. Cormode, Lancaster; Ronald Schoenfelder, Atchison, both of Kans.

[73] Assignee: Unit Rail Anchor Company, Hillside, Ill.

[21] Appl. No.: 718,387

[22] Filed: Jun. 20, 1991

[51] Int. Cl.[5] .............................................. B23P 11/00

[52] U.S. Cl. .................................. 29/243.56; 29/267; 254/131

[58] Field of Search .................. 29/235, 243.5, 243.56, 29/267, 270, 278, 254; 254/131

[56] References Cited

U.S. PATENT DOCUMENTS

| | | | |
|---|---|---|---|
| 1,159,271 | 11/1915 | Ray | 29/243.56 |
| 1,664,529 | 4/1928 | Schroeder | 29/243.5 |
| 1,910,833 | 5/1933 | Hippey | 29/267 |
| 4,999,898 | 3/1991 | Schmeling | 29/243.56 |
| 5,020,202 | 6/1991 | Turrell | 29/243.56 |

*Primary Examiner*—J. J. Swann

*Attorney, Agent, or Firm*—Kinzer, Plyer, Dorn, McEachran & Jambor

[57] ABSTRACT

A wrench for applying rail anchors to the flange of a rail of a railroad track. The wrench includes an elongated handle and a shoe. The shoe is connected to the handle by a pair of links which are pivotally connected to the shoe and the handle. The shoe has a nose, a tine, a heel and a jaw opening. The jaw opening is defined between the nose and the tine and receives the hook end of a rail anchor when the hook end is placed over the flange of a rail prior to installation. The nose of the shoe rests on the flange face of the rail in contact with the hook end of the anchor when the wrench is in its anchor installing position. The first link of the pair of links is pivotally connected at one end to the handle and at its opposite end to the nose of the shoe. The first link engages the head of the rail to fix in position its pivotal connection with the handle. The second link connects the handle and the heel of the shoe. As the handle is rotated about its pivotal connection with the first link, the second link forces the shoe to rotate about its pivotal connection to the first link. Rotation of the shoe forces the anchor into engagement with the rail flange until the anchor latch is seated.

4 Claims, 2 Drawing Sheets

RAIL ANCHOR WRENCH

BACKGROUND AND SUMMARY OF THE INVENTION

This invention is directed to a wrench for installing rail anchors on the rails of railroad track. Rail anchors of the spring clip type are typically snapped into place on the base flange of a rail against a tie. Machines are used for the installation of large numbers of anchors during the construction or renovation of railroad track. However, some anchors are installed by hand where the numbers are small so that the use of large and expensive machinery is not economically feasible. The presently used hand tools are in the nature of large wrenches. The use of such a wrench requires considerable exertion of force by the worker who pulls and pushes on the elongated handle of the wrench to move it downwardly and snap the rail anchor on to the rail flange. The motions needed to apply an anchor are not smooth and continuous thus the worker is subject to the possibility of back, shoulder and arm injuries.

Therefore, an object of this invention is a manually operated wrench for installing spring clip type rail anchors which wrench permits a worker to attach an anchor using a substantially constant application of force to the wrench handle.

Another object of this invention is a wrench of the type in which a portion of the wrench remains stationary against the rail during installation of the anchor for stability.

Another object of this invention is a manual wrench having a linkage between the handle and an anchor carrying shoe so that maximum force will be applied to the anchor as the anchor latch receives the rail flange.

Another object of this invention is a wrench having an anchor carrying shoe which shoe pivots relative to the wrench handle during installation for ease of operation.

Another object of this invention is a wrench having a shoe which remains in contact with the anchor during the entire installation time.

Another object of this invention is a wrench which utilizes one fixed rotational axis for the anchor applying shoe and a second fixed rotational axis for the handle.

Other objects of the invention may be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

Figure 1:
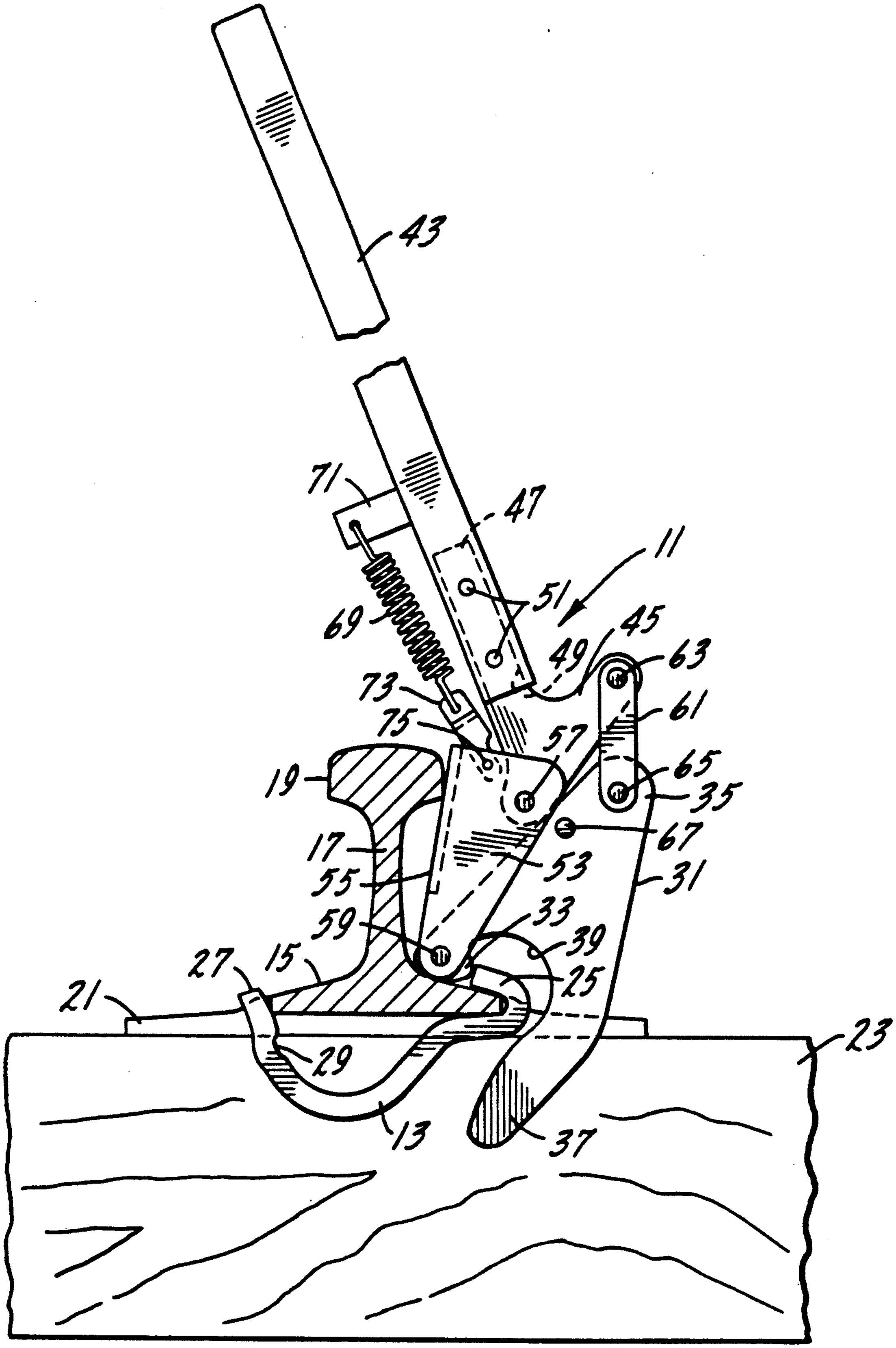
FIG. 1 is a side elevational view of an anchor-applying wrench of this invention shown near the beginning of the anchor installation procedure with some parts broken away and others shown in cross section.

This invention is directed to a wrench 11 for applying a rail anchor 13 to a flange 15 of a rail 17 of a railroad track. A typical rail 17 has a head 19 and rests on a tie plate 21 positioned on a tie 23. A typical rail anchor 13 has a hook end 25 which is hooked over the flange 15 of the rail and a latch end 27 which is forced under the other side of the flange 15 of the rail until its latch 29 seats on the edge of the flange.

The wrench 11 of this invention includes a shoe 31 formed of a flat, irregularly shaped piece of metal having a nose 33, a heel 35 and a toe or tine 37. A jaw 39 of the shoe is defined between the nose and the tine. The jaw receives the hook end 25 of the anchor 13 during installation of the rail anchor on the flange of the rail. A handle 43 preferably formed of metal tubing has a T-shaped member 45 at its lower end with the neck 47 of the T-shaped member telescoping into a socket 49 of the handle and held thereto by rivets 51. The shoe is connected to the handle by a first link 53 which is triangular in shape and has a plate 55 extending at right angles to the triangular portion of the link which plate engages the head 19 of the rail 17. A pivot pin 57 connects the link 53 to the T-shaped member 45 of the handle 43 while another pivot pin 59 connects the link 53 to the nose 33 of the shoe 31. A second link 61 is connected to the T-shaped member 45 by a pivot pin 63 and to the heel 35 of the shoe by a pivot pin 65. A stop pin 67 extends out of the shoe a short distance to engage the second link 61 to prevent it from moving to an over center position beyond its position shown in FIG. 3 of the drawings. A tension spring 69 extends between an arm 71 attached to the handle 43 and a link 73 which is pivotally connected by a pin 75 to the first link 53.

A rail anchor 13 is installed using the wrench 11 of this invention in the following manner. As is conventional, the anchor 13 is applied to the flange 15 of a rail 17 by placing the hook end 25 of the anchor over one of the sloping flanges 15 of the rail. The shoe 31 of the wrench is positioned with its nose 33 resting on the flange 15 of the rail. The nose also engages the hook end 25 of the anchor 13 as shown in FIG. 1 of the drawings. The plate 55 of the first link 53 of the wrench engages the head 19 of the rail with the spring 69 pulling the shoe 31 and the links 53 and 61 into a compact or closed position of the wrench as shown in FIG. 1.

Figure 2:
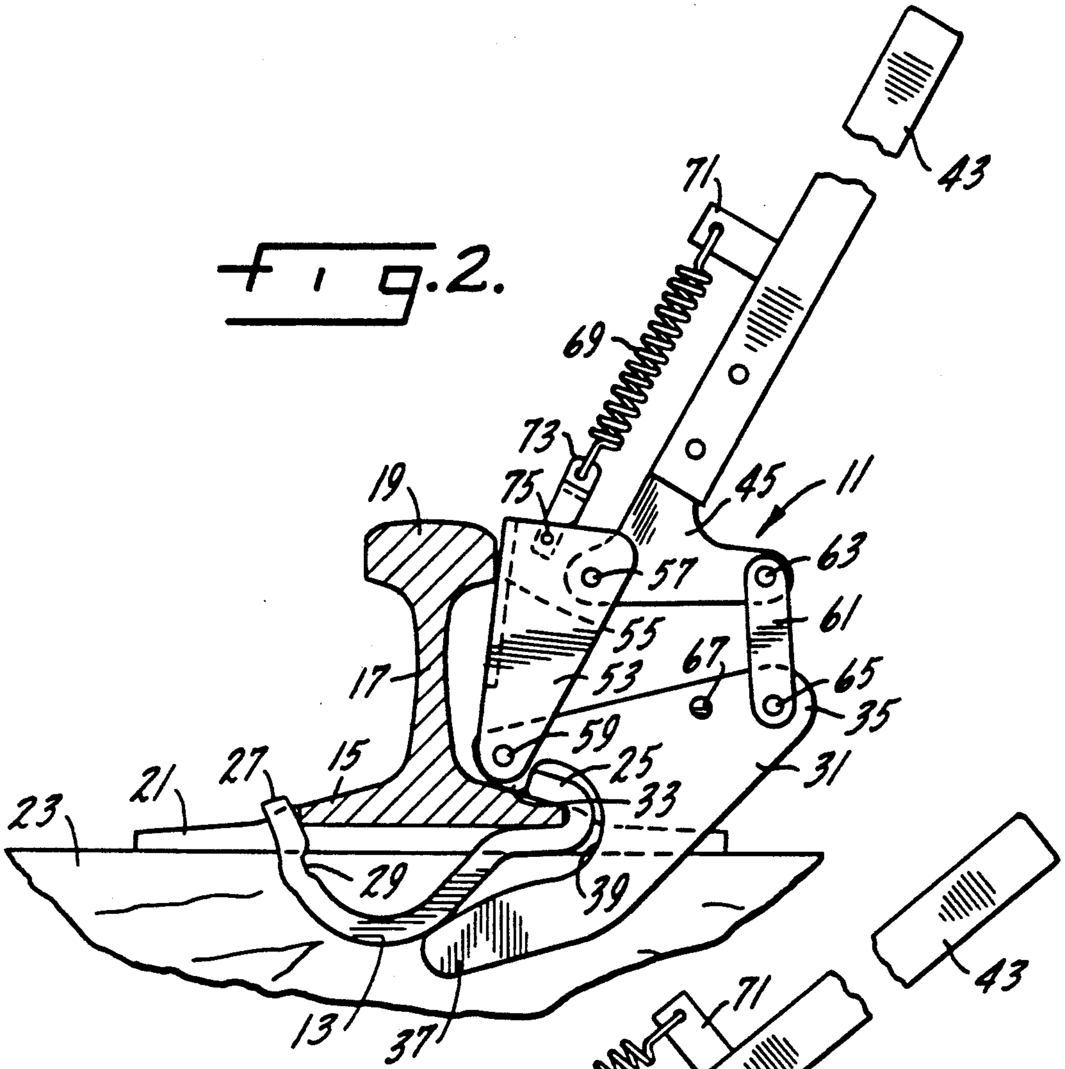
FIG. 2 is a view similar to FIG. 1 showing a moved position of the wrench.

The worker now rotates the handle 43 in a clockwise direction as shown in FIG. 1 of the drawings to the position shown in FIG. 2 of the drawings in which the tine 37 of the shoe 31 engages the under side of the anchor 13 to force the latch end 27 of the anchor into contact with the opposite edge of the flange 15 of the rail 13. Here the handle 43 is being rotated about the pivotal connection 57 between its T-shaped portion 45 and the first link 53. The first link is held in position against the rail head 19 and against the nose 33 of the shoe 31 which in turn is being held against the flange 15 of the rail due to the force exerted against the handle 43. As the handle 43 is rotated in a clockwise direction as viewed in FIGS. 1 and 2 of the drawings, the second link 61 is unfolding relative to the T-shaped member 45 and is forcing the shoe 31 to rotate about its pivotal connection 59 with the first link 53. As the shoe 31 rotates in a clockwise direction, its tine 37 moves into contact with the under side of the anchor 13 to thereby force the latch end 27 of the anchor into engagement with the flange 15 of the rail.

Figure 3:
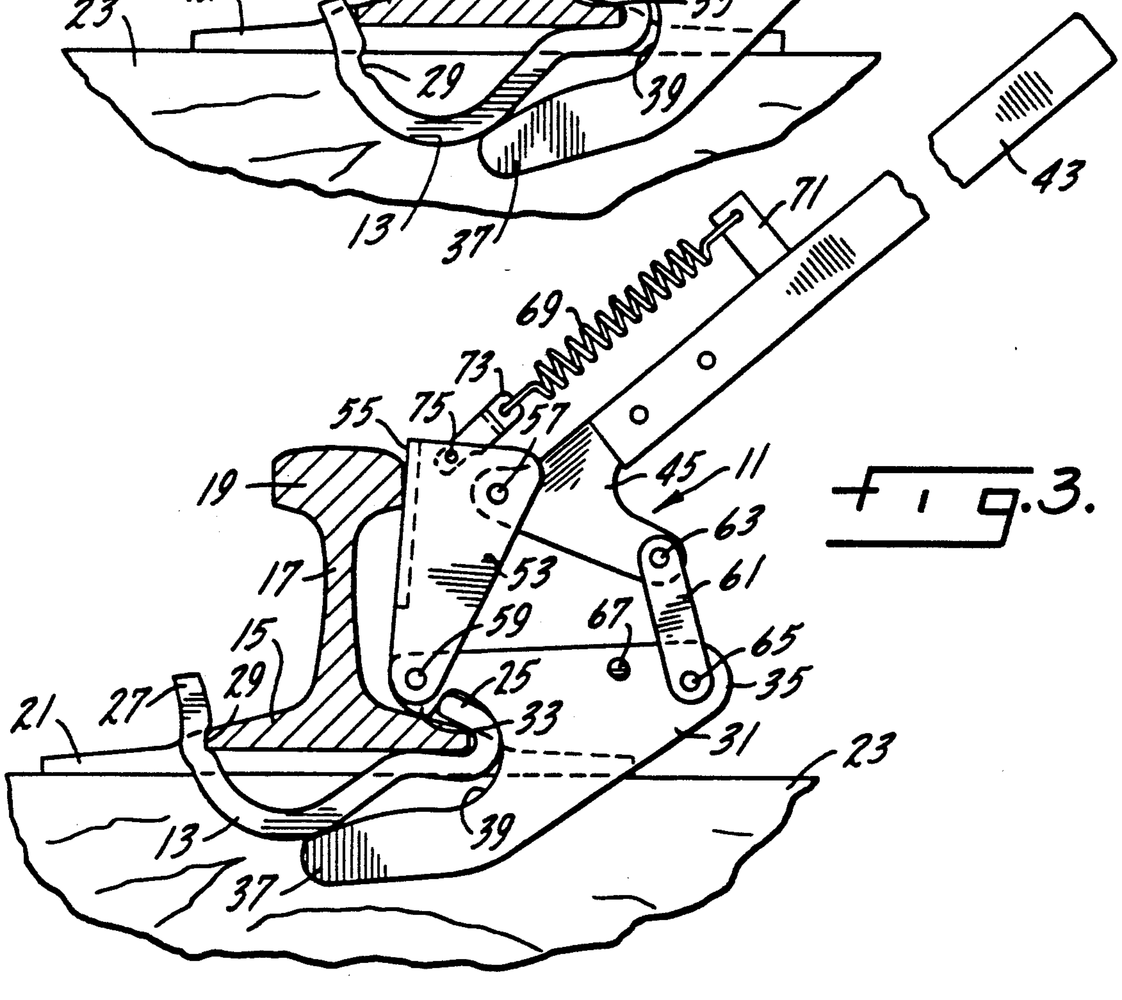
FIG. 3 is a view similar to FIG. 1 showing the wrench and rail anchor in their final moved positions.

Rotation of the handle 43 in a clockwise direction is continued until the handle 43 reaches the position shown in FIG. 3 of the drawings in which its link 61 has opened to almost a straight line relationship with the T-shaped member 45 and thereby forced the shoe 31 to continue to rotate in a clockwise direction about its pivot point 59 until the latch 29 of the anchor 13 seats on the edge 15 of the flange of the rail 17. It should be noted that as the handle rotates to the position shown in FIG. 3 of the drawings, its link 61 in assuming a straight line position between the T-shaped member 45 of the handle and the shoe 31 is thereby exerting maximum force against the shoe 31 and thus against the rail anchor 13.

As can be appreciated from the foregoing description of the sequence of operation, a worker is able to rotate the handle 43 in a steady clockwise motion to continuously apply pressure to the rail anchor 13 with the force effectively increasing as the handle 43 approaches a horizontal position and its link 61 and the T-shaped member 45 approach a straight line relative to each other. During the rotation of the handle in the clockwise direction the spring 69 is expanded so that when the handle 43 is released it will be returned by the spring in a counterclockwise direction to the compact or closed position of the wrench 11 shown in FIG. 1 of the drawings.

The embodiments of the invention in which an exclusive property or privilege is claimed are defined as follows:

1. A wrench for applying rail anchors of the type having a hook and a latch end to the flange of a rail of a railroad track of the type having a sloping flange face while moving said wrench with a substantially uniform downwardly pivoting motion, said wrench including:

an elongated handle, an elongated shoe having opposite ends with a nose and a tine at one end, a heel at the other end of said shoe and a jaw opening with the jaw opening being defined between said nose and said tine, said jaw opening shaped and sized to receive said hook end of a rail anchor when said hook end of said rail anchor is placed over the flange of a rail prior to installation, said nose sized and shaped to rest on said sloping flange face of the rail with said nose in contact with the hook end of the anchor when said wrench is in its anchor installing position, a pair of links pivotally attaching said handle and said shoe, a first of said pair of links pivotally connected at one end to said handle and at its opposite end to said nose of said shoe, said first link positioned to engage the head of said rail when said nose of said shoe is resting on said sloping flange face of said rail to fixedly locate the axis of the pivotal connection of said first link with said handle and thereby to fix the axis of rotation of said handle relative to said head of said rail, a second link of said pair of links connecting said handle and said heel of said shoe to transmit rotation of said handle about the pivotal connection of said handle with said first link through said second link to said shoe to rotate said shoe about its pivotal connection to said first link to thereby move the tine of said shoe into contact with said anchor and said latch end of said anchor into engagement with the flange of said rail upon continuous downwardly pivoting movement of said handle.

2. The wrench of claim 1 in which the pivotal connection of said shoe relative to said first link is fixed relative to the rail.

3. The wrench of claim 1 in which the rotation of said handle forces the first link against the rail head as the shoe is forced against the anchor.

4. A wrench for applying a rail anchor of the type having a hook end and a latch end to the flange of a railroad track of the type having a sloping flange face using a substantially uniform downwardly pivoting motion, said wrench including:

an elongated handle, an elongated shoe having opposite ends with a nose and a tine at one end, a heel at the opposite end and a jaw opening with the jaw opening being defined between said nose and said tine, said jaw opening shaped and sized to receive said hook end of a rail anchor when said hook end is placed over the flange of a rail prior to installation, said nose sized and shaped to rest on said sloping flange face of the rail with said nose in contact with the hook end of the anchor when said wrench is in its anchor installing position, first and second links each pivotally attaching said handle to said shoe, said first link of said pair of links engaging said rail and said shoe provide a pivotal to axis for rotation of said handle which axis is fixed relative to said rail and an axis of rotation for said shoe which is fixed relative to said sloping face of said flange, a second link of said pair of links being pivotally connected at one end to said handle at a location spaced from the pivotal connection of said first link to said handle, said second link also being pivotally connected at an opposite end to the heel of said shoe, said wrench, at the commencement of the installation of an anchor to the flange of a rail, being positioned in a collapsed state of said shoe and said pair of links relative to one another and in which said second link is almost aligned longitudinally with said shoe and said handle is located in an over-center position extending toward said rail, rotation of said handle away from said rail about its pivotal connection with said first link moving said second link from its almost aligned longitudinally position with said shoe to a second position in which said second link extends almost at right angles to said shoe as the show moves said rail anchor into its final latching position with said flange.

* * * * *